United States Patent [19]
Creemer

[11] Patent Number: 5,951,644
[45] Date of Patent: Sep. 14, 1999

[54] SYSTEM FOR PREDICTING AND MANAGING NETWORK PERFORMANCE BY MANAGING AND MONITORING RESOURSE UTILIZATION AND CONNECTION OF NETWORK

[75] Inventor: David Z. Creemer, Palo Alto, Calif.

[73] Assignee: Apple Computer, Inc., Cupertino, Calif.

[21] Appl. No.: 08/778,042

[22] Filed: Dec. 24, 1996

[51] Int. Cl.[6] .......................... G06F 13/14; G06F 15/173
[52] U.S. Cl. .................. 709/229; 709/227; 709/223; 370/229; 370/230
[58] Field of Search .................. 395/674, 200.8, 395/200.55, 200.53, 200.65, 500; 379/230; 370/232, 229, 230; 709/229, 227, 223

[56] References Cited

U.S. PATENT DOCUMENTS

| | | |
|---|---|---|
| 3,916,383 | 10/1975 | Malcolm . |
| 5,541,987 | 7/1996 | Topper et al. ........................ 379/230 |
| 5,633,861 | 5/1997 | Hanson et al. ....................... 370/232 |
| 5,673,253 | 9/1997 | Shaffer ................................. 370/229 |
| 5,727,149 | 3/1998 | Hirata et al. . |
| 5,745,694 | 4/1998 | Egawa et al. . |
| 5,751,963 | 5/1998 | Umetsu . |
| 5,751,969 | 5/1998 | Kapoor . |
| 5,754,831 | 5/1998 | Berman .............................. 395/500 |

OTHER PUBLICATIONS

Intercall UUCP Gateway Manual, "Quick Mail: Your Complete Messaging Solution," CE Software, Inc., 1995, ch.1 pp. 1–36.

*Primary Examiner*—Krisna Lim
*Attorney, Agent, or Firm*—Beyer & Weaver, LLP

[57] ABSTRACT

A system to manage network resources of a network so that network performance is predictable and manageable is disclosed. According to the system, network resource utilization is monitored and then computer systems seeking to transmit or receive data over the network as requested to do so at times that serve to more efficiently utilize the network resources. A method for managing network resources is also disclosed.

16 Claims, 7 Drawing Sheets

SYSTEM FOR PREDICTING AND MANAGING NETWORK PERFORMANCE BY MANAGING AND MONITORING RESOURSE UTILIZATION AND CONNECTION OF NETWORK

BACKGROUND OF THE INVENTION

1. Field of the Invention

The present invention relates to communications over networks and, more particularly, to management of network resources for improved communications over networks.

2. Description of the Related Art

A communications network includes links or transmission media, data storage, and servers, all of which serve as resources of the communications network. When these resources become overloaded, the communications network does not operate properly and performance rapidly deteriorates. Thus, it is desirable to not overload the resources of the communications network.

An electronic mail system is a particular type of communications network. Typically, an electronic mail system has a local network over which user machines (computers) are interconnected. An example of a local network is a Local Area Network (LAN) that interconnects user machines located proximate to one another. Normally, one machine coupled to the local network is referred to as a mail server. The mail server operates to manage and administer the distribution and reception of mail messages to/from the various user machines.

An electronic mail system may also have access to a global network known as the Internet. Normally, the electronic mail system can couple to the Internet via an Internet service provider (ISP). Each ISP services a large number of different mail servers. The ISP has limited resources to handle all the incoming requests to transmit and receive electronic mail messages from the different mail servers being serviced. In a typical setup for smaller scale local area networks (LANs), the ISP is remotely located from the different the mail servers and the Internet. A mail server connects to the ISP over phone lines when initiated by the mail server. The ISP, on the other hand, is connected to the Internet over a high-bandwidth link known as a leased line. Hence, to obtain global electronic mail service, the mail server connects to the ISP as needed or requested. Once the mail server is connected with the ISP, the mail server is able to send and receive electronic mail messages over the Internet. The connection of the mail server to the ISP is normally done at predetermined connection times that have be set by a system administrator.

Generally, the connection to the ISP is a fee-based service. As a result, to reduce expenses, it is desirable in most cases to limit the frequency at which the connections to the ISP are made as well as the duration of the connections. However, if the frequency at which the connections are made is too infrequent, the performance of the electronic mail system suffers. The duration of the connections is normally the length of time needed to send and receive all the electronic mail messages between the mail server and the ISP. In any case, the system administrator determines when the connections are to be made. In a typical electronic mail system, when installing and configuring the software on the mail server, the system administrator will select the connection times. For example, in an electronic mail system known as QuickMail, produced by CE Software, Inc. of West Des Monies, Iowa, the system administrator is presented with a dialog screen where the connect times are selected. With QuickMail, the system administrator can set the electronic mail system to connect: when at least x number of messages are waiting; when at least y number of urgent messages are waiting; and/or every z minutes between certain hours of certain days in a week. With QuickMail, the system administrator can also restrict the system to connect only once per day.

One significant problem with conventional mail systems is that the loading of the ISP's resources is overloaded. In particular, during peak usage hours, a large number of the electronic mail systems in existence will likely desire connection to their ISP so that they may send and receive mail through the Internet. However, it is burdensome for an ISP to have to service all of its electronic mail system subscribers at the same time. It is burdensome because the ISP would have to buy hardware and provide resources for the worst case scenario, namely, servicing all of its electronic mail system subscribers at the same time. Given the competitive nature of the ISP business, it is also cost prohibitive for an ISP to provide hardware and resources for the worst case scenario. For this reason, many ISPs cannot concurrently handle connections from a large number of its electronic mail systems subscribers. When a large number of connections are needed (e.g., during periods of peak utilization), the ISP resources are overloaded and performance is poor or unavailable to many of its electronic mail systems subscribers.

Thus, there is a need for techniques that allow an ISP to better manage its resources so that its performance is more predictable and more manageable.

SUMMARY OF THE INVENTION

Broadly speaking, the invention is a system to manage resources of a network so that network performance is predictable and manageable. According to the system, network resource utilization is monitored and then computer systems seeking to transmit or receive data over the network are requested do so at times that serve to more efficiently utilize the network resources.

The invention can be implemented in numerous ways, including as a method, a system, an apparatus, or a computer readable medium. Several embodiments of the invention are discussed below.

As a method for managing connection of an electronic mail server to an Internet service provider, one embodiment of the invention includes the operations of: receiving, at the Internet service provider, a registration request and connection needs from the electronic mail server; storing the connection needs at the Internet service provider; monitoring resource utilization at the Internet service provider; determining suggested mail transmission times based on the connection needs of the electronic mail server and the resource utilization at the Internet service provider; and forwarding the suggested mail transmission times to the electronic mail server. Additionally, the method may also include the operations of: receiving, at the electronic mail server, the suggested mail transmission times from the Internet service provider; and scheduling the connection times for the electronic mail server to the Internet service provider in accordance with the suggested mail transmission times.

As a method for managing connection of an electronic mail server to an Internet service provider, another embodiment of the invention includes the operations of: monitoring resource utilization at the Internet service provider to produce resource utilization information; receiving, at the Internet service provider, a registration request from the electronic mail server; and forwarding the resource utilization information to the mail server. Additionally, the method may also include the operations of: receiving, at the electronic mail server, the resource utilization information from the Internet service provider; and determining connection times for the electronic mail server to the Internet service provider based on the connection needs of the electronic mail server and the resource utilization information provided by the Internet service provider.

As a method for managing network resources for a network, still another embodiment of the invention includes the operations of: monitoring resource utilization of the network to produce resource utilization information; forwarding the resource utilization information to computers coupled to the network; and thereafter determining desirable times to transmit data over the network taking into consideration the resource utilization information. Preferably, the network is the Internet, and the resource utilization information is maintained in a histogram format at predetermined time intervals.

As a computer system connectable to a network, one embodiment of the invention includes: a network interface, the network interface operates to connect the computer system to the network; a data storage device, the data storage device stores network resource utilization information obtained from the network via the network interface; a processor, the processor executes computer instructions and controls input/output operations, the processor also determines desirable times to transmit data over the network taking into consideration the resource utilization information and then transmits data over the network at the desirable times via the network interface. Preferably, the processor determines the desirable times based on the resource utilization information and user preferences.

As a computer readable medium containing program instructions for managing connection of an electronic mail server to an Internet service provider, one embodiment of the invention includes: computer readable code devices for receiving, at the Internet service provider, a registration request and connection needs from the electronic mail server; computer readable code devices for storing the connection needs at the Internet service provider; computer readable code devices for monitoring resource utilization at the Internet service provider; computer readable code devices for determining suggested mail transmission times based on the connection needs of the electronic mail server and the resource utilization at the Internet service provider; and computer readable code devices for forwarding the suggested mail transmission times to the electronic mail server.

As a computer readable medium containing program instructions for managing connection of an electronic mail server to an Internet service provider, another embodiment of the invention includes: computer readable code devices for monitoring resource utilization at the Internet service provider to produce resource utilization information; computer readable code devices for receiving, at the Internet service provider, a registration request from the electronic mail server; and computer readable code devices for forwarding the resource utilization information to the mail server.

As a computer readable medium containing program instructions for managing network resources for a network, still another embodiment of the invention includes: computer readable code devices for monitoring resource utilization of the network to produce resource utilization information; computer readable code devices for forwarding the resource utilization information to computers coupled to the network; and computer readable code devices for thereafter determining desirable times to transmit data over the network taking into consideration the resource utilization information.

The advantages of the invention are numerous. One advantage of the invention is that the demand placed on network resources is flattened so as to make better and more efficient use of the network resources. As a result, the network performance is predictable and manageable. Another advantage of the invention is that the quantity of hardware and other resources required by the network for a given performance level is reduced due to the improved management of the network resources. Yet another advantage of the invention is that network congestion is reduced.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention pertains to a system to manage resources of a network so that network performance is predictable and manageable. According to the invention, network resource utilization is monitored and then computer systems seeking to transmit or receive data over the network are requested to do so at times that serve to more efficiently utilize the network resources.

Embodiments of the invention are discussed below with reference to FIGS. 1–7. However, those skilled in the art will readily appreciate that the detailed description given herein with respect to these figures is for explanatory purposes as the invention extends beyond these limited embodiments.

Figure 1:
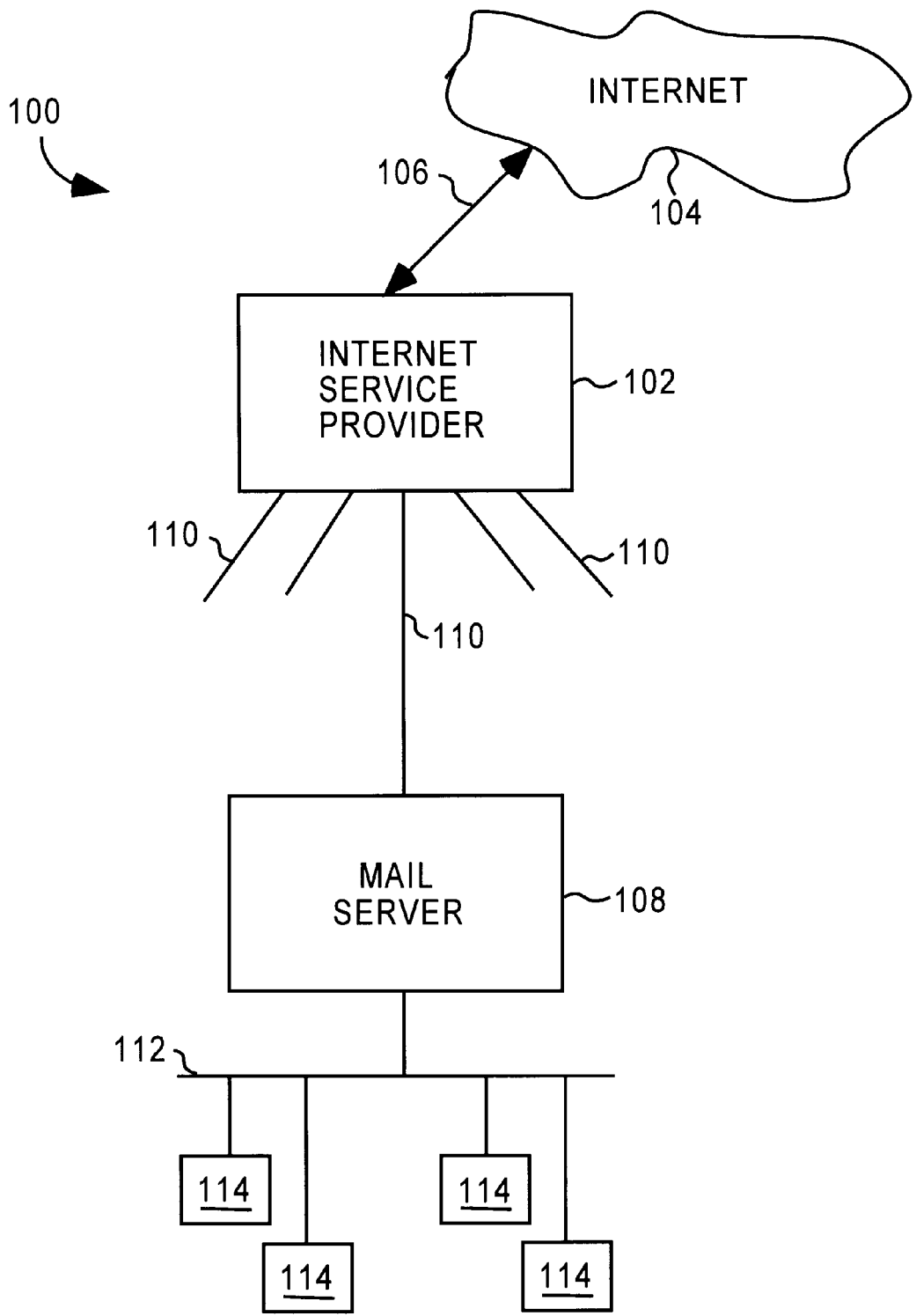
FIG. 1 illustrates an electronic mail system according to an embodiment of the invention.

FIG. 1 illustrates an electronic mail system 100 according to an embodiment of the invention. The electronic mall system 100 includes an Internet service provider (ISP) 102 that connects to the Internet 104 over a high-speed link 106. The ISP 102 also connects to a mail server 108 over a phone line 110. Typically, the Internet service provider 102 has a number of phone lines 110 which are coupled to mail servers or other end-user computers. The mail server 108 is a computer system that supervises electronic mail delivery and usually resides on a local network 112. Also residing on the local network 112 are various computers 114 that are utilized by end users. As an example, the local network 112 can be a Local Area Network (LAN).

Figure 2:
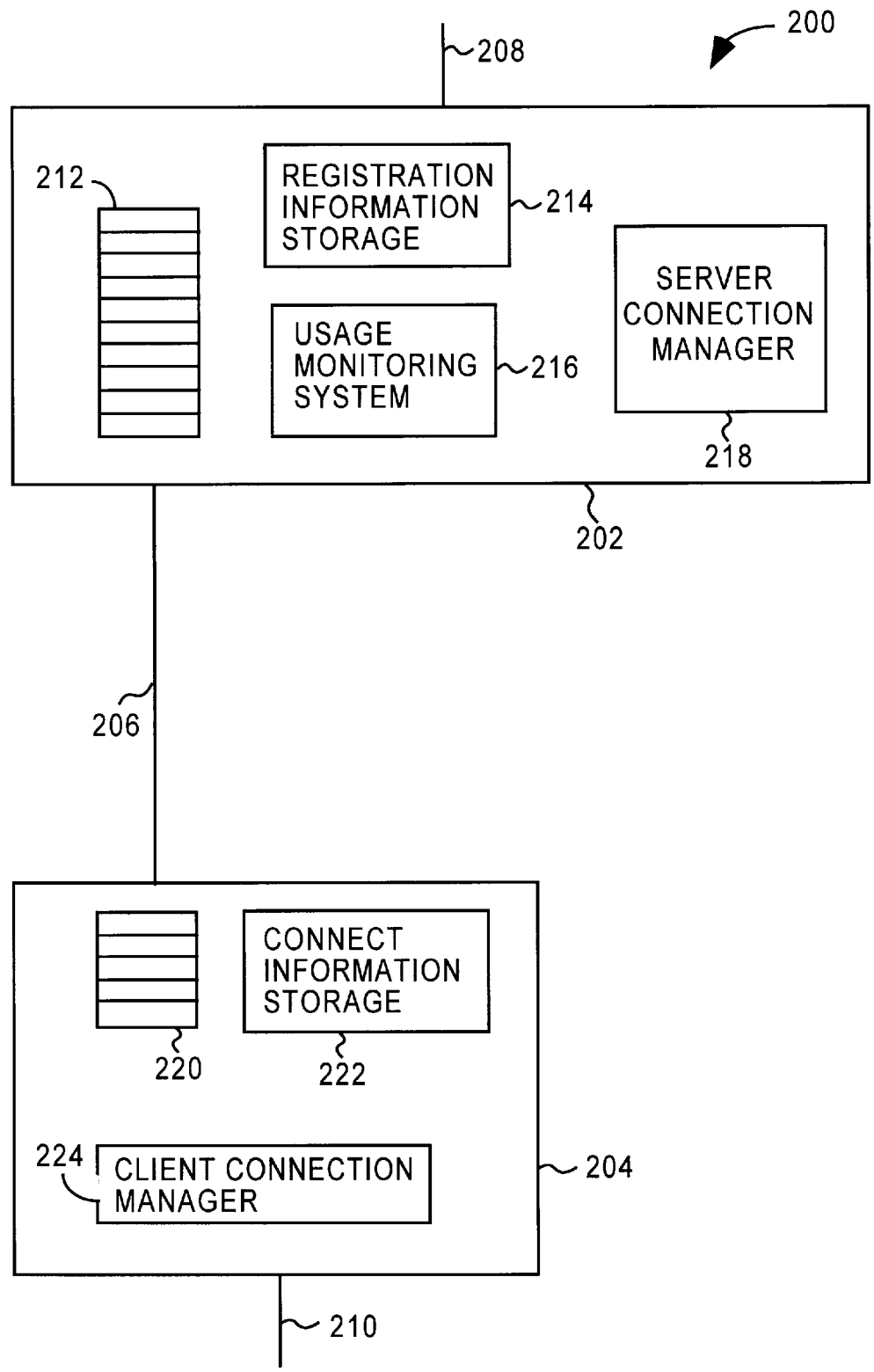
FIG. 2 is a block diagram of an electronic mail system.

FIG. 2 is a block diagram of an electronic mail system 200. The electronic mail system 200 is an embodiment of the electronic mail system 100 illustrated in FIG. 1. The electronic mail system 200 illustrated in FIG. 2 is a diagram of an electronic mail system that has been simplified to facilitate discussion of the invention. Those skilled in the art will recognize that the electronic mail system 200 would also include other structures and functions not illustrated in FIG. 2 but understood by those in the art.

The electronic mail system 200 includes an Internet service provider (ISP) 202 and a mail server 204. The ISP 202 and the mall server 204 are capable of being connected over a phone line 206. In other words, the mail server 204 includes a modem (not shown) through which the mail server 204 can dial into a modem (not shown) within the ISP 202. The ISP 202 couples to the Internet 104 over a high-speed data link 208. Also, the mail server 204 couples to the computers 114 of end users over a link 210.

The ISP 202 includes a message queue 212, a registration information storage 214, a usage monitoring system 216, and a server connection manager 218. The message queue 212 is an outbound message queue for messages that are to be delivered to the mail server 204. Since the connection between ISP 202 and the mail server 204 is not always present with this arrangement of the electronic mail system 200, the message queue 212 holds the messages that are to be transferred to the mail server 204 until such time as the connection is made.

The registration information storage 214 provides data storage for registration information associated with the mail server 204. The registration information storage 214 may store connection information that has been provided by the mail server 204 to the ISP 202. The connection information is, for example, the connection needs of the mail server 204. As examples, the connection needs could be any of the following: connect twice in 24 hours; connect once per day; or connect every hour on weekdays and four times in 24 hours on weekends. The connection information can be separate from or combined with the registration information.

The usage monitoring system 216 operates to periodically monitor the utilization of resources associated with the ISP 202. As an example, the usage monitoring system 216 could monitor the number of active phone lines 206 (110) that are active on a periodic basis (e.g., every minute) to produce utilization data, and then store this utilization data in a histogram format for later use. Alternatively, as another example, the usage monitoring system 216 can monitor central processing unit (CPU) load on a periodic basis and likewise store the resulting utilization data in a histogram format for later use. By storing the utilization data in a histogram format, the utilization data pertaining to the utilization of resources is statistically averaged so that the utilization data provides a prediction (based on past performance) as to future utilization of resources at the ISP 202. The quality and accuracy of the statistical averaging provided by the invention can vary and in many cases need not be sophisticated. FIG. 5B is a diagram or graph of a representative utilization histogram that would be associated with or createable from the data obtained by the usage monitoring system 216. It should also be recognized that such data obtained from the usage monitoring system 216 can be stored in a variety of formats besides a histogram format.

The server connection manager 218 within in the ISP 202 manages the connection of the ISP 202 with the mail server 204 as well as other mail servers connected to the ISP 202. The server connection manager 218 operates to manage the connection of the mail server 204 to the ISP 202. In one embodiment, the server connection manager 218 retrieves the connection information (e.g., connection needs) of the mail server 204 from the registration information storage 214 and the utilization data from the usage monitoring system 216. Then, the server connection manager 218 determines suggested connection times that are most desirable from the perspective of utilization of the ISP 202, while taking into consideration the connection needs of the mail server 204. Thereafter, the suggested connection times that have been determined are forwarded to the mail server 204.

In another embodiment, the server connection manager 218 could simply forward the utilization data to the mail server 204 in a predetermined format and then the connection times could be determined by the mail server 204. Here, the utilization data in effect represents a demand curve for the network resources. With this embodiment, the connection information may not be needed at the ISP 202, though it may be useful to limit the amount of the utilization data that is forwarded to the mail server 204.

The mail server 204 includes a message queue 220, a connect information storage 222, and a client connection manager 224. The message queue 220 is an outbound message queue that temporarily stores messages that are to be forwarded to the ISP 202. However, since the connection between the ISP 202 and the mail server 204 is over the phone line 206, the connection is not always present. Hence, messages destined for the ISP 202 are held in the memory queue 220 until a connection is made between the mail server 204 and the ISP 202 over the phone line 206.

The connect information storage 222 stores information about how and when the connection from the mail server 204 to the ISP 202 should preferably occur. The connection information held in the connect information storage 222 can, for example, be set during configuration or installation of the mail server 204. In other words, in an electronic mail system in which the mail server is managed by a system administrator. The system administrator configures the mail server to preferable connect to an ISP at predetermined specified times or a number of times daily and/or whenever there is mail to send. In addition to storing the connection information, the connect information storage 222 can also store the suggested connection times or the utilization data provided by the ISP 204.

The client connection manager 224 within in the mail server 202 manages the connection of the mail server 202 with the ISP 202. The client connection manager 224 operates to manage the connection of the mail server 204 to the ISP 202 at connection times. The connection times are determined by the client connection manager 224 based on the connection information (e.g., connection needs) and the suggested connection times or utilization data provided by the server connection manager 218. In one embodiment, the client connection manager 224 receives the suggested connection times from the server connection manager 218 (via the connect information storage 222 or other storage) as well as the connect information from the connect information storage 222. Then, the client connection manager 224 determines connect times that the mail server 204 will attempt to connect to the ISP 202. The connect times can be determined in a number of different ways. For example, the connect time could be the suggested connection times, some modification of the suggested connection times, or overridden by the connection needs. Thereafter, the determined connect times are the times at which the mail server 204 attempts to connect to the ISP 204 to deliver and receive mail messages.

The operation of the electronic mail system 200 and its components are explained further below.

Figure 3:
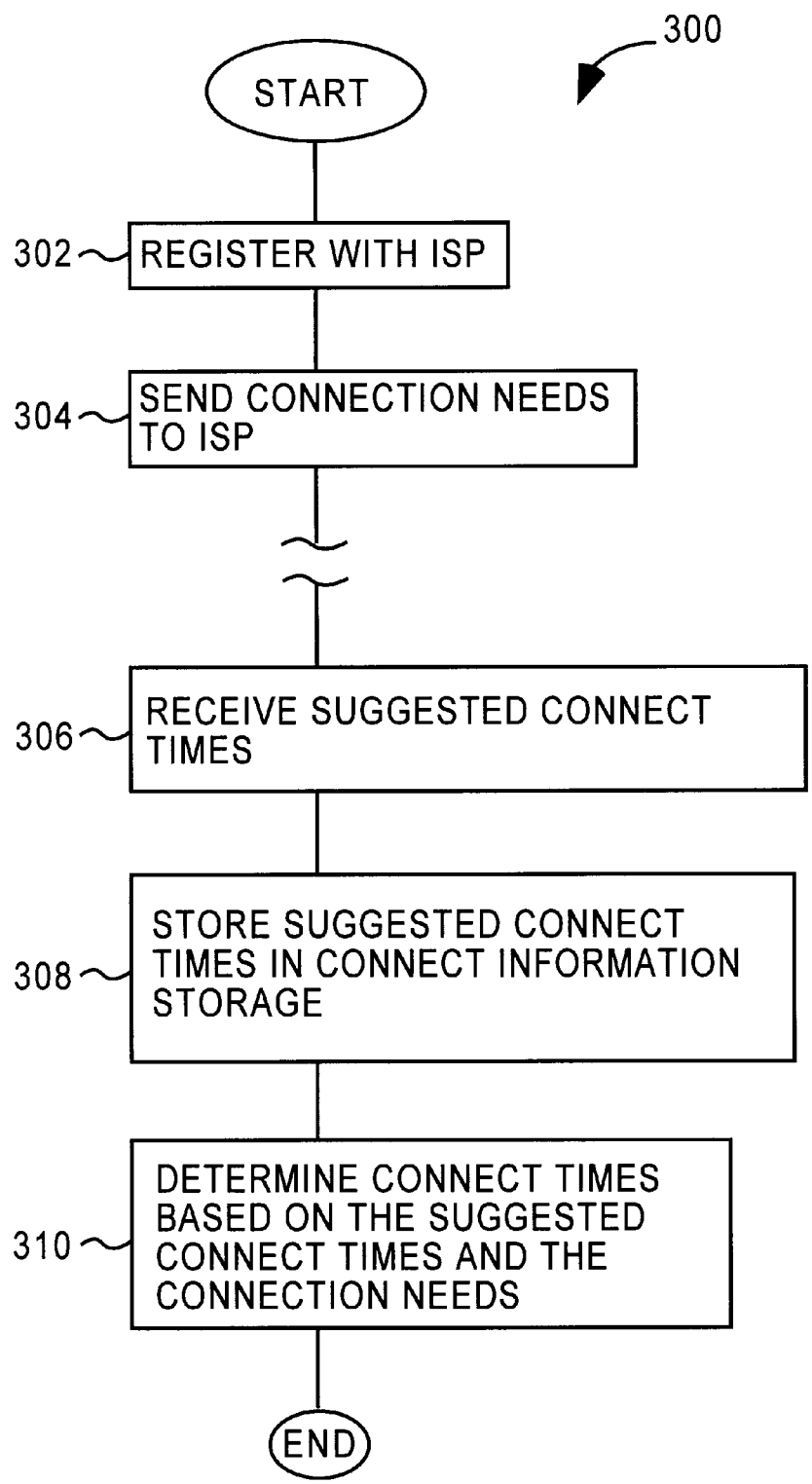
FIG. 3 is a flow diagram of mail server configuration processing according to an embodiment of the invention.

FIG. 3 is a flow diagram of mail server configuration processing 300 according to an embodiment of the invention. The mail server configuration processing 300 is performed by the mail server 204. The mail server processing 300 communicates information between the ISP 202 and the mail server 204 and then determines the times at which the mail server 204 connects to the ISP 202. In one embodiment, the mail server configuration processing 300 is performed by an application program (e.g., a configuration or installation program) running on the mail server 204.

The mail server configuration processing 300 begins by the mail server 204 registering (302) with the ISP 202. While registering (302) with the ISP 202, the mail server 204 sends (304) its connection needs to the ISP 202. The connection needs can be expressed in a variety of ways. As an example, the connection needs might be any of the following: connect twice in 24 hours; connect once per day; or connect every hour on weekdays and four times in 24 hours on weekends. Thereafter, the mail server configuration processing 300 awaits the receipt (306) of the suggested send times from the ISP 202. In this embodiment, the receiving (306) of the suggested send times is done during the initial configuration of the mail server 204 with the ISP 202. However, the receiving (306) may also be done during subsequent modifications to the mail server 204 or whenever the ISP 202 desires to resend the suggested send times to the mail server 204. In any case, suggested send times that are received are then stored in the connect information storage 222 of the mail server 204. Next, connect times for the mail server 204 to connect to the ISP 202 are determined (310). The connect times are determined (310) based on the suggested connect times and the connection needs. Following block 310, the mail server configuration processing 300 is complete and ends.

In another embodiment, the mail server configuration processing can receive the utilization data from the ISP 202, instead of the suggested connect times. The mail server 204 can then determine the connect times from the utilization data and the connection needs.

Figure 4:
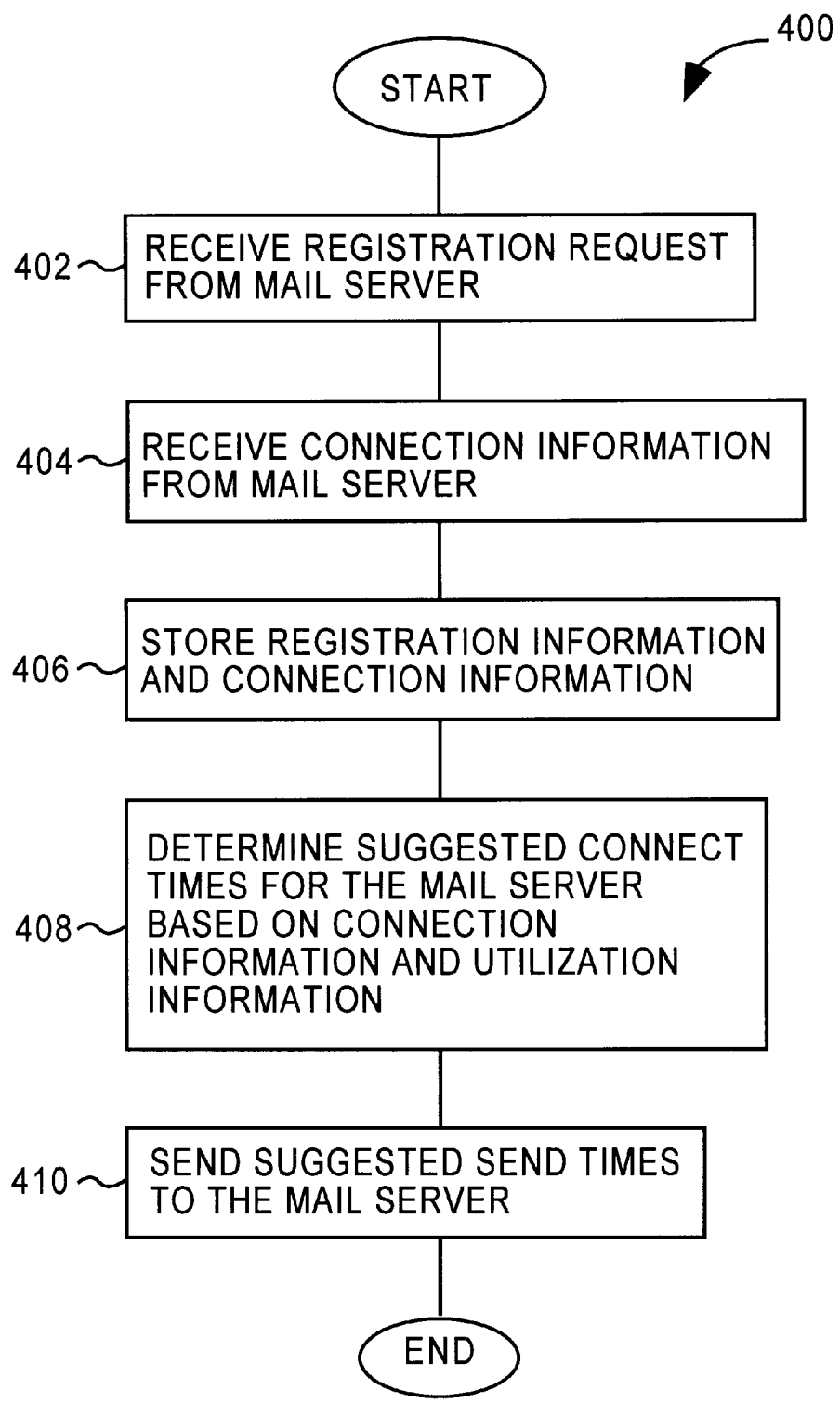
FIG. 4 is a flow diagram of ISP registration processing according to an embodiment of the invention.

FIG. 4 is a flow diagram of ISP registration processing 400 according to an embodiment of the invention. As an example, the ISP registration processing 400 can be carried out by the ISP 202 in FIG. 2. In one embodiment, the ISP registration processing 400 is performed by an application program (e.g., utility program) running on the ISP 202 every time a mail server registers for service with the ISP 202.

The ISP registration processing 400 initially receives (402) a registration request from the mail server 204. The registration request will include certain registration information as is conventional. The ISP 202 also receives (404) connect information that the system administrator of the mail server 204 selects or otherwise request. In other words, the ISP 202 receives (404) the connection needs of the mail server 204. Examples of the connection needs have been provided above. Next, the registration information and the connect information (e.g., the connection needs) are stored (406) in the registration information storage 214 of the ISP 202. The ISP 202 then determines (408) suggested connect times for the mail server 204 based on the connection information as well as utilization information. The utilization information is produced by the usage monitoring system 216 of the ISP 202 and is explained in detail below with reference to FIGS. 5A and 5B. Several examples of the determining (408) of the suggested connect times are provided below to further illustrate this operation. After the suggested connect times are determined (408), the suggested connect times are then sent (410) to the mail server 204. Following block 410, the ISP registration processing 400 is complete and ends.

In another embodiment, the ISP registration processing can supply the utilization data, instead of the suggested connect times, to the mail server 204. The mail server 204 can then determine the connect times from the utilization data and the connection needs.

Figure 5A:
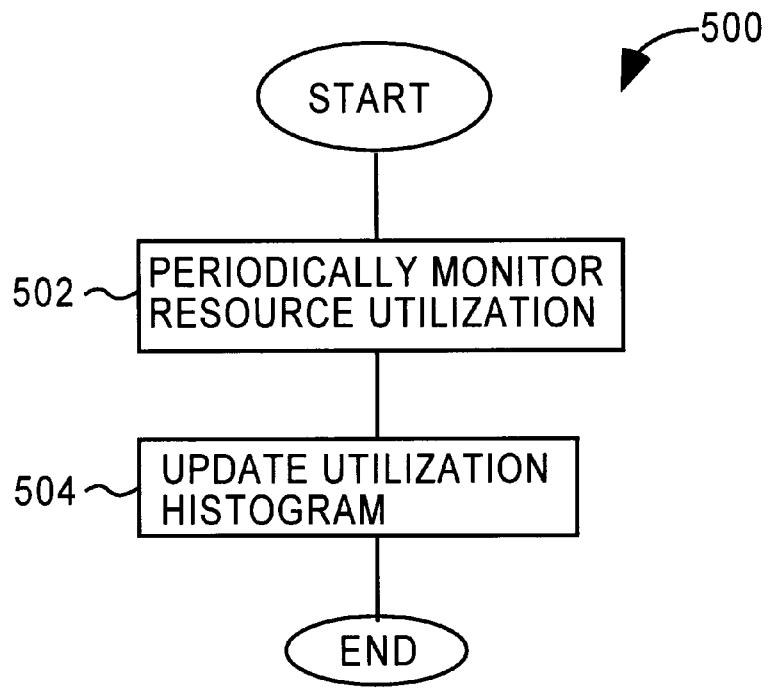
FIG. 5A is a flow diagram of utilization information processing according to an embodiment of the invention.
Figure 5B:
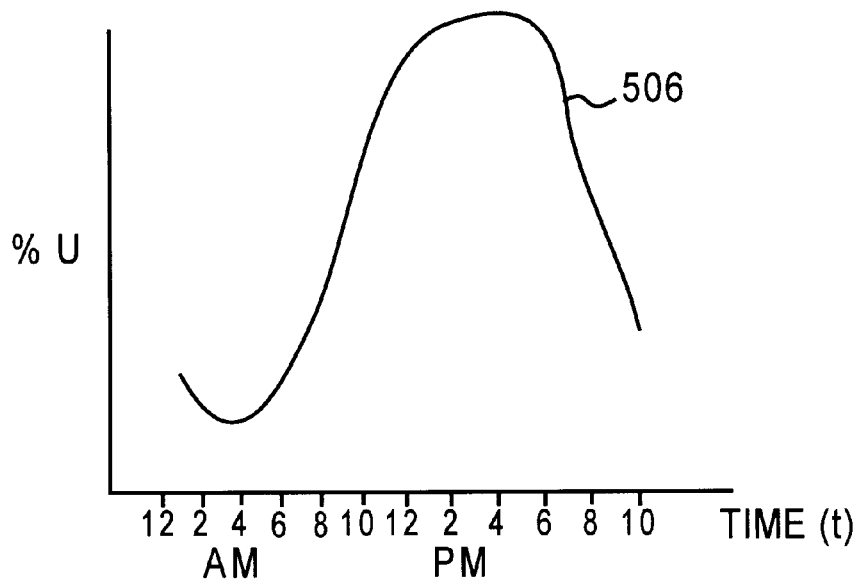
FIG. 5B is a diagram or graph of a representative utilization histogram that would be associated with or createable from the data obtained by the usage monitoring system.

FIG. 5A is a flow diagram of utilization information processing 500 according to an embodiment of the invention. In one embodiment, the utilization information processing 500 is performed by the usage monitoring system 216 of the ISP 202 illustrated in FIG. 2. The utilization information processing 500 periodically monitors (502) resource utilization of the ISP 202. As an example, the ISP 202 can monitor the number of active phone lines 110; 206 to determine the load on the ISP resources at predetermined times. As other examples, the ISP 202 can monitor the processing load on the ISP's computing resources, the ISP's outbound traffic on the link connecting to the Internet (e.g., leased line), RAM usage, or any other fixed resource of the ISP 202. The obtained utilization information is used to create or update (504) a utilization histogram for the ISP 202. The utilization histogram or data thereof can be stored in the ISP 202 by or within the usage monitoring system 216. Following block 504, the utilization information processing 500 is complete and ends.

Although the utilization information need not be stored or arranged to provide a histogram, the maintaining of the histogram or its underlying data is advantageous because it provides some historical perspective on the resource utilization being monitored. Having a historical perspective provides for better predictions as to likely utilization levels in the future and thus facilitates network resource management. FIG. 5B is a graph of a representative utilization histogram 506 produced by the utilization information. The vertical axis is the percent utilization (% U) and the horizontal axis is time of day (t). According to the representative utilization histogram 506, the utilization of the ISP resources is at its maximum at about 1:00 PM and its minimum at about 4:00 AM.

EXAMPLE 1

Suppose the connection needs of a mail server are to connect once per day. The utilization data is represented by FIG. 5B. The suggested connect times could then be 4:00 AM when the network resources are most available. The system administrator is then able to accept or override the suggested connect time. The ISP can provide the system administrator with an incentive (e.g., reduced rate) to accept the suggested connect time.

EXAMPLE 2

Suppose the connections needs of a mail server are to connect (i) within fifteen minutes of receiving an urgent mail message to transmit over the Internet and (ii) once in the beginning of the day and once at the end of the day. The utilization data is represented by FIG. 5B. For the urgent messages to be transmitted, the connection can be initiated by the mail server every fifteen minutes without consideration of the utilization data as controlled by the mail server. However, if the utilization data is detailed to the minute for example, then suggested connect times can be aligned with the low utilization points within fifteen minute time intervals. Nevertheless, for the two daily connections requested for normal and bulk mail messages, the suggested connect times could then be 6:00 AM and 10:00 PM when utilization is relatively low while meeting the connection needs.

EXAMPLE 3

Suppose the connection needs of a mail server are to connect twice during normal business hours. The utilization data is represented by FIG. 5B. Although urgent or high priority messages would be treated differently, for normal and low priority messages, the suggested connect times could be 10:10 AM and 4:22 PM. These suggested connect times are times during normal business hours with a reasonable amount of time separating them. The advantage of connecting at ten minutes after 10:00 and twenty-two minutes after 4:00 is to randomize the connection requests between hours. However, in the event that the utilization data is maintained and monitored for smaller time increments than an hour, such randomization may not be needed.

After the connect times for the mail server 204 are determined as discussed above, the transmission and reception of electronic mail messages between the ISP 202 and the mail server 204 operates as follows according to one of many possible embodiments. In the embodiment described below with reference to FIGS. 6 and 7, the mail server 204 has a high priority queue and a regular priority queue. The high priority queue holds outgoing messages that the message-sender has designated as urgent and which should be sent without delay. On the other hand, the regular priority queue holds outgoing messages that the message-sender has designated as normal and which can be sent in ordinary course.

Figure 6:
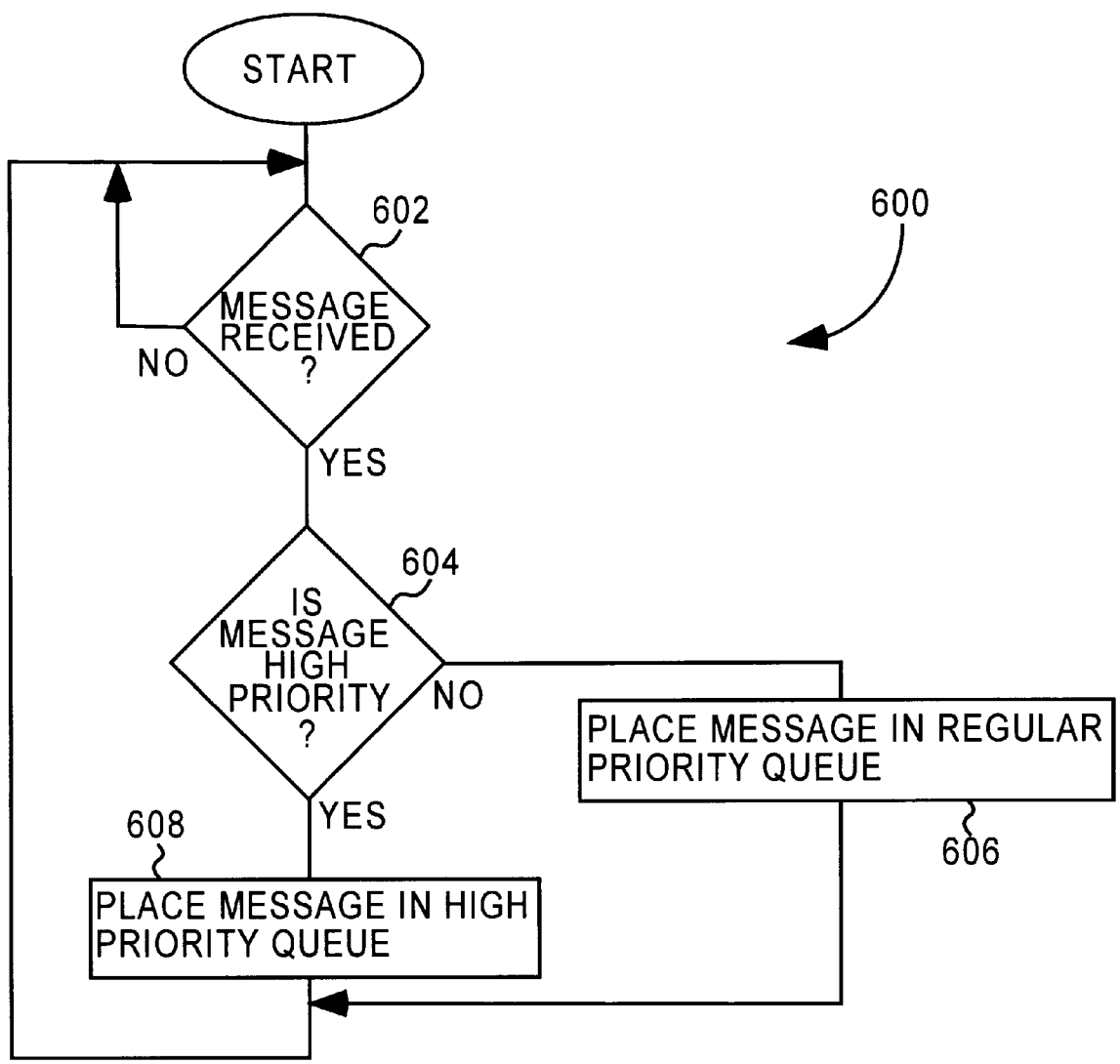
FIG. 6 is a flow diagram of mail server queuing processing according to an embodiment of the invention.

FIG. 6 is a flow diagram of mail server queuing processing 600 according to an embodiment of the invention. The mail server queuing processing 600 is, for example, performed by the mail server 204. The mail server queuing processing 600 begins with a decision block 602 that determines whether a message has been received. If a message has not been received, the mail server queuing processing 600 awaits the reception of a message. Once a message has been received, a decision block 604 determines whether the message has a high priority. If the message does not have a high priority, the message is placed 606 in a regular priority queue. On the other hand, if the decision block 604 determines that the message has a high priority, then the message is placed 608 in a high priority queue. Following blocks 606 and 608, the mail server queuing processing 600 returns to repeat block 602 and subsequent blocks so as to process the receipt of additional messages to be forwarded to the ISP 202. Of course, the mail server queuing processing 600 need not be implemented in a loop structure, but could also be implemented as an interrupt, polling or event-driven process.

Figure 7:
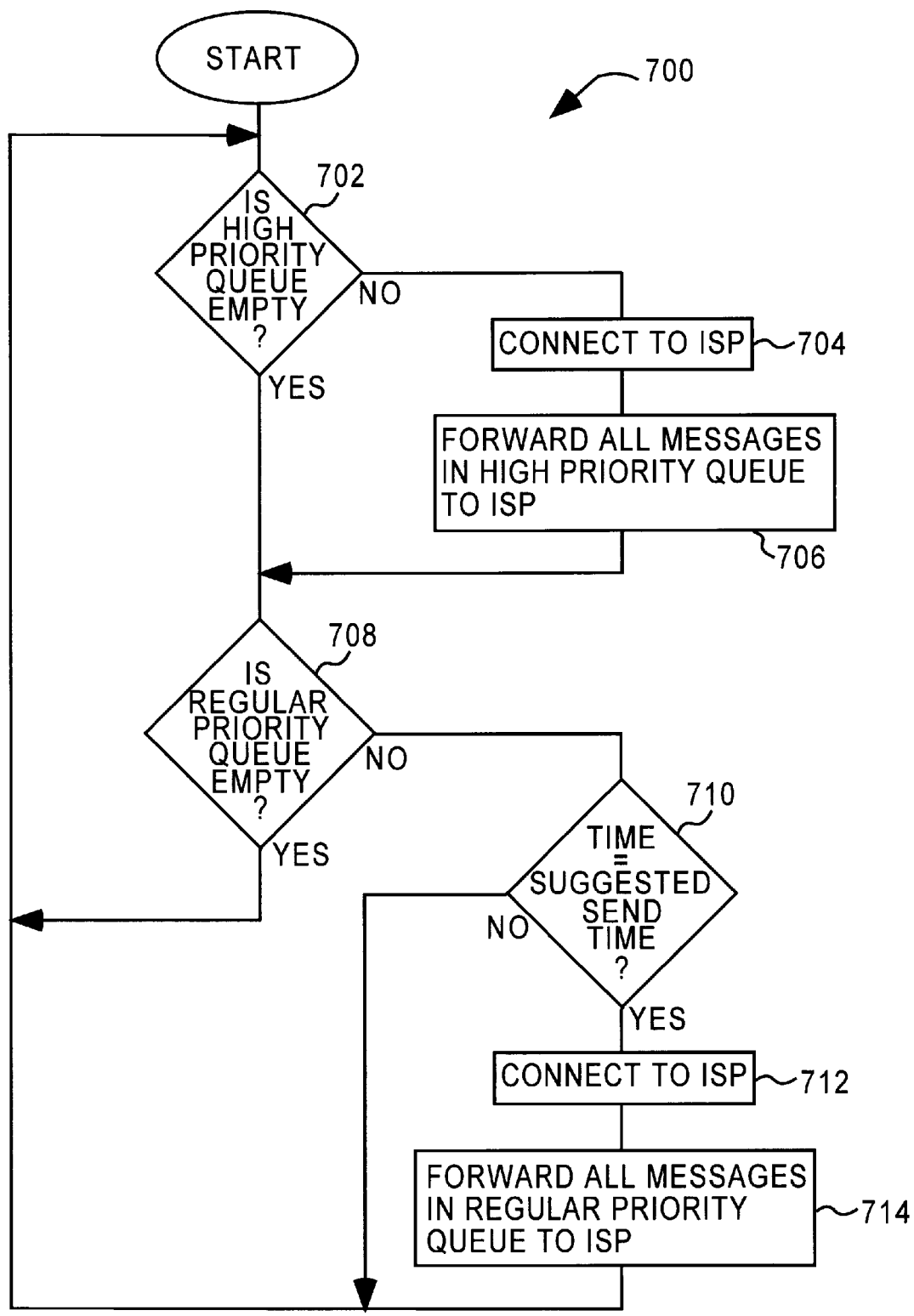
FIG. 7 is a flow diagram of mail server connection processing according to an embodiment of the invention.

FIG. 7 is a flow diagram of mail server connection processing 700 according to an embodiment of the invention. The mail server connection processing 700 is, for example, performed by the mail server 204. The mail server connection processing 700 begins with a decision block 702 that determines whether the high priority queue is empty. When the decision block 702 determines that the high priority queue is not empty, the mail server 204 operates to connect 704 to the ISP 202. Then, all messages are forwarded 706 from the high priority queue to the ISP 202. Following block 706 as well as following the decision block 702 when the high priority queue is empty, a decision block 708 determines whether the regular priority queue is empty. When the decision block 708 determines that the regular priority queue is not empty, a decision block 710 determines whether the current time is equal to the determined connect time. If the current time is equal to the determined connect time, then the mail server 204 connects 712 to the ISP 202. All the messages in the regular priority queue are then forwarded 714 to the ISP 202. Following block 714, as well as following the decision block 710 when the time is not equal to the determined connect time, the processing returns to repeat block 702 and subsequent blocks. Likewise, following the decision block 708 when the regular priority queue is empty, the processing will also return to repeat block 702 and subsequent blocks. Hence, according to this embodiment of the mail server connection processing 700, the high priority messages are forwarded to the ISP 202 without delay; however, the regular priority messages are forwarded to the ISP 202 only at the determined connect times. Of course, messages from both the queues could be forwarded whenever a connection was instigated by either of blocks 706 and 714. Again, the structure of the mail server connection processing 700 need not be a loop structure but could also be an interrupt, polling, or event-driven operation.

By forwarding regular priority messages at the determined connect times, the ISP 202 is able to flatten the demand for it network resources. To encourage the system administrators to comply with the suggested connect times that the ISP 202 has suggested, the ISP 202 can offer reduced rates for such complying connections. This would discourage system administrators from blindly overriding the suggested connect times for other times.

Although the much of the above described detailed description pertains to an electronic mail system, the invention is generally applicable to data transmissions over multi-user networks where network resources can become congested. For example, the utilization data could pertain to network traffic on the Internet. By supplying the utilization data to the ISPs or end-users coupling to the Internet, the ISPs or end-users would be able to determine when the resources of the Internet are sufficiently available. The ISPs or end-users can then cause data transfers over the Internet to occur when traffic on the Internet is low. The ISPs or end-users could be motivated to use such low traffic time periods by rate reductions or Internet etiquette. This embodiment is particularly well suited for sending low priority data (e.g., bulk messages; remote backups; web site mirroring; news discussion groups) over the Internet.

Although the above-described embodiment focused on connections from a server machine to the Internet through an ISP, the server machines could also connect to the Internet directly with a high-speed link or indirectly through another network and then the ISP. In the case of a fixed connection situation (i.e., high-speed link), it may be more desirable to monitor the percentage of bandwidth being utilized on a periodic basis (e.g., every minute) as the network resource.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for managing connection of an electronic mail server to an Internet service provider, said method comprising:

receiving, at the Internet service provider, a registration request and connection needs from the electronic mail server, the connection needs pertain to subsequent connections between the electronic mail server and the Internet service provider;

storing the connection needs at the Internet service provider;

monitoring resource utilization at the Internet service provider;

determining suggested mail transmission times based on the connection needs of the electronic mail server and the resource utilization at the Internet service provider; and forwarding the suggested mail transmission times to the electronic mail server.

2. A method as recited in claim 1, wherein said method further comprises:

receiving, at the electronic mail server, the suggested mail transmission times from the Internet service provider; and scheduling the connection times for the electronic mail server to the Internet service provider in accordance with the suggested mail transmission times.

3. A method as recited in claim 1, wherein said method further comprises:

receiving, at the electronic mail server, the suggested mail transmission times from the Internet service provider;

determining, at the electronic mail server, whether to override the suggested mail transmission times obtained from the Internet service provider; and scheduling the connection times for the electronic mail server to the Internet service provider in accordance with at least one of the suggested mail transmission times and the connection needs of the electronic mail server.

4. A method as recited in claim 1, wherein said method further comprises:

receiving, at the electronic mail server, the suggested mail transmission times from the Internet service provider;

modifying the suggested mail transmission times obtained from the Internet service provider based on the connection needs of the electronic mail server; and scheduling the connection times for the electronic mail server to the Internet service provider in accordance with the modified suggested mail transmission times.

5. A method for managing connection of an electronic mail server to an Internet service provider, said method comprising:

monitoring resource utilization at the Internet service provider to produce resource utilization information;

receiving, at the Internet service provider, a registration request from the electronic mail server;

forwarding the resource utilization information to the mail server;

receiving, at the electronic mail server, the resource utilization information from the Internet service provider; and determining connection times for the electronic mail server to the Internet service provider based on the connection needs of the electronic mail server and the resource utilization information provided by the Internet service provider.

6. A method for managing network resources for a network, said method comprising:

monitoring resource utilization of the network to produce resource utilization information;

forwarding the resource utilization information to computers coupled to the network; and thereafter determining desirable times to transmit data over the network taking into consideration the resource utilization information, wherein the resource utilization information is maintained in a histogram format.

7. A method as recited in claim 6, wherein the network is the Internet.

8. A method as recited in claim 6, wherein the resource utilization information is maintained in the histogram format at predetermined time intervals.

9. A method as recited in claim 6, wherein said method further comprises:

transmitting data over the network in accordance with the determined desirable times.

10. A computer system connectable to a network, said computer system comprising:

a network interface, said network interface operates to connect said computer system to the network;

a data storage device, said data storage device stores network resource utilization information obtained from the network via said network interface;

a processor, said processor executes computer instructions and controls input/output operations, said processor also determines desirable times to transmit data over the network taking into consideration the resource utilization information and then transmits data over the network at the desirable times via said network interface, wherein the resource utilization information is maintained in a histogram format.

11. A computer system as recited in claim 10, wherein the resource utilization information is maintained in the histogram format at predetermined time intervals.

12. A computer readable medium containing program instructions for managing connection of an electronic mail server to an Internet service provider, said computer readable medium comprising:

computer readable code devices for receiving, at the Internet service provider, a registration request and connection needs from the electronic mail server, the connection needs pertain to subsequent connections between the electronic mail server and the Internet service provider;

computer readable code devices for storing the connection needs at the Internet service provider;

computer readable code devices for monitoring resource utilization at the Internet service provider;

computer readable code devices for determining suggested mail transmission times based on the connection needs of the electronic mail server and the resource utilization at the Internet service provider; and computer readable code devices for forwarding the suggested mail transmission times to the electronic mail server.

13. A computer readable medium as recited in claim 12, wherein said computer readable medium further comprises:

computer readable code devices for receiving, at the electronic mail server, the suggested mail transmission times from the Internet service provider; and computer readable code devices for scheduling the connection times for the electronic mail server to the Internet service provider in accordance with the suggested mail transmission times.

14. A computer readable medium containing program instructions for managing connection of an electronic mail server to an Internet service provider, said computer readable medium comprising:

computer readable code devices for monitoring resource utilization at the Internet service provider to produce resource utilization information;

computer readable code devices for receiving, at the Internet service provider, a registration request from the electronic mail server;

computer readable code devices for forwarding the resource utilization information to the mail server;

computer readable code devices for receiving, at the electronic mail server, the resource utilization information from the Internet service provider; and computer readable code devices for determining connection times for the electronic mail server to the Internet service provider based on the connection needs of the electronic mail server and the resource utilization information provided by the Internet service provider.

15. A computer readable medium containing program instructions for managing network resources for a network, said computer readable medium comprising:

computer readable code devices for monitoring resource utilization of the network to produce resource utilization information;

computer readable code devices for forwarding the resource utilization information to computers coupled to the network; and computer readable code devices for thereafter determining desirable times to transmit data over the network taking into consideration the resource utilization information, wherein the network is the Internet and the resource utilization information is maintained in a histogram format at predetermined time intervals.

16. A computer readable medium as recited in claim 15, wherein said computer readable medium further comprises:

computer readable code devices for transmitting data over the network in accordance with the determined desirable times.

* * * * *

UNITED STATES PATENT AND TRADEMARK OFFICE
CERTIFICATE OF CORRECTION

PATENT NO. : 5,951,644
DATED : September 14, 1999
INVENTOR(S) : Creemer

It is certified that error appears in the above-identified patent and that said Letters Patent is hereby corrected as shown below:

On the title page, item [54]:

"RESOURSE" should be --RESOURCE--.

Column 1, line 4, in the Title, "RESOURSE" should be --RESOURCE--.

Column 4, line 64, "mall" should be --mail--.

Column 5, line 20, "mall" should be --mail--.

Column 7, line 64, "request" should be --requests--.

Signed and Sealed this

Thirteenth Day of June, 2000

Attest:

Q. TODD DICKINSON

*Attesting Officer*    *Director of Patents and Trademarks*